United States Patent [19]

Rouquié

[11] 4,210,095
[45] Jul. 1, 1980

[54] MACHINE FOR DRAINING PARTS EMERGING FROM HOT GALVANIZING BATHS

[75] Inventor: Georges Rouquié, Fontenay le Fleury, France

[73] Assignee: Bertin & Cie, Plaisir, France

[21] Appl. No.: 968,182

[22] Filed: Dec. 11, 1978

Related U.S. Application Data

[62] Division of Ser. No. 785,790, Apr. 8, 1977, Pat. No. 4,129,668.

[30] Foreign Application Priority Data

Apr. 12, 1976 [FR] France ................ 76 10648

[51] Int. Cl.² ............................................. C23C 1/02
[52] U.S. Cl. ................................. 118/57; 118/423; 118/500; 427/57; 427/347; 427/433
[58] Field of Search ........... 427/57, 347, 433, DIG. 8; 118/57, 423

[56] References Cited

U.S. PATENT DOCUMENTS

| 3,639,142 | 2/1972 | Maxwell et al. | 427/347 |
| 3,639,152 | 2/1972 | Bodine | 427/57 |

*Primary Examiner*—Ralph S. Kendall
*Attorney, Agent, or Firm*—A. W. Breiner

[57] ABSTRACT

A method of draining parts emerging from hot galvanizing baths using a range of vibration excitation frequencies capable of covering the fundamental frequencies of the parts to be drained. Three different methods are disclosed. According to a first method the vibrations are obtaining by exciting with a narrow band white noise the support for the parts to be drained. According to a second method, the vibrations are produced from a single exciter fed with narrow band white noise and energizing vibrators through the medium of amplifiers. According to a third method, the vibrations are produced by a number of small vibrators each of which furnishes one of the frequencies of the chosen spectrum, whereby said vibrators jointly synthesize the narrow band white noise. Three different means are disclosed for producing vibrations, one where the vibrators are mounted on a false lifting beam, the second where the vibrators are mounted on the lifting beam, and the third where the vibrators are enclosed in a container placed between the lifting beam and the hoisting means.

5 Claims, 3 Drawing Figures

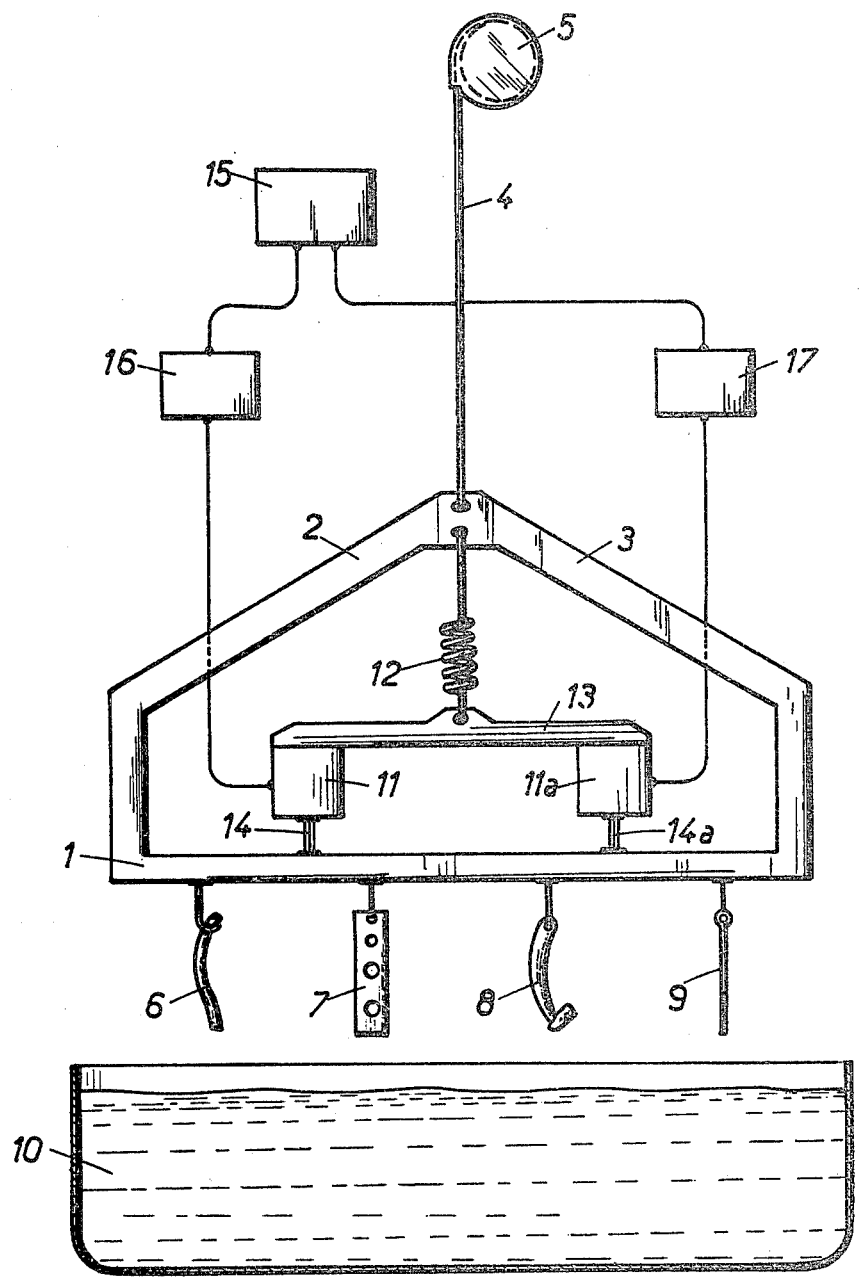
FIG.:1

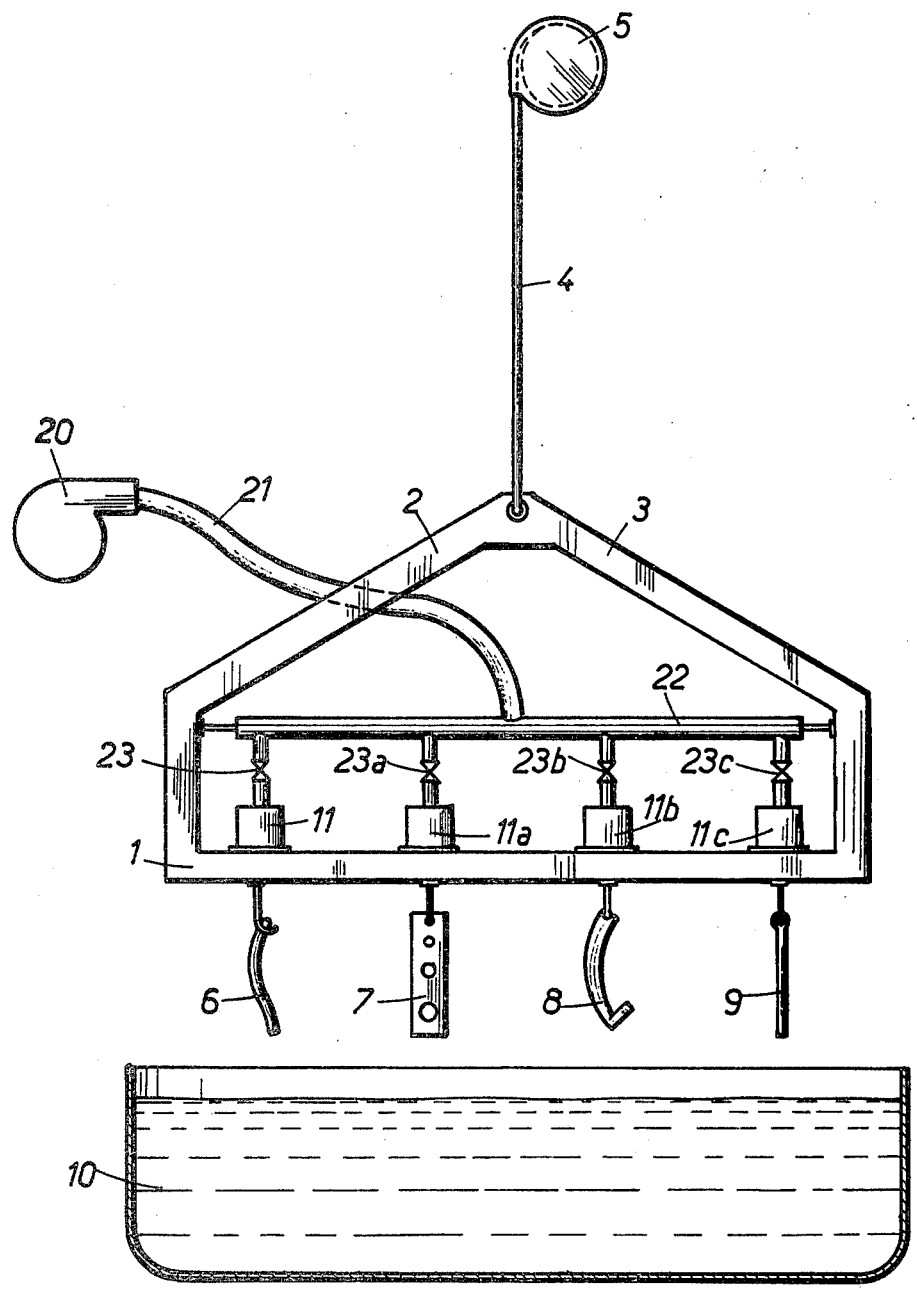
FIG.: 2

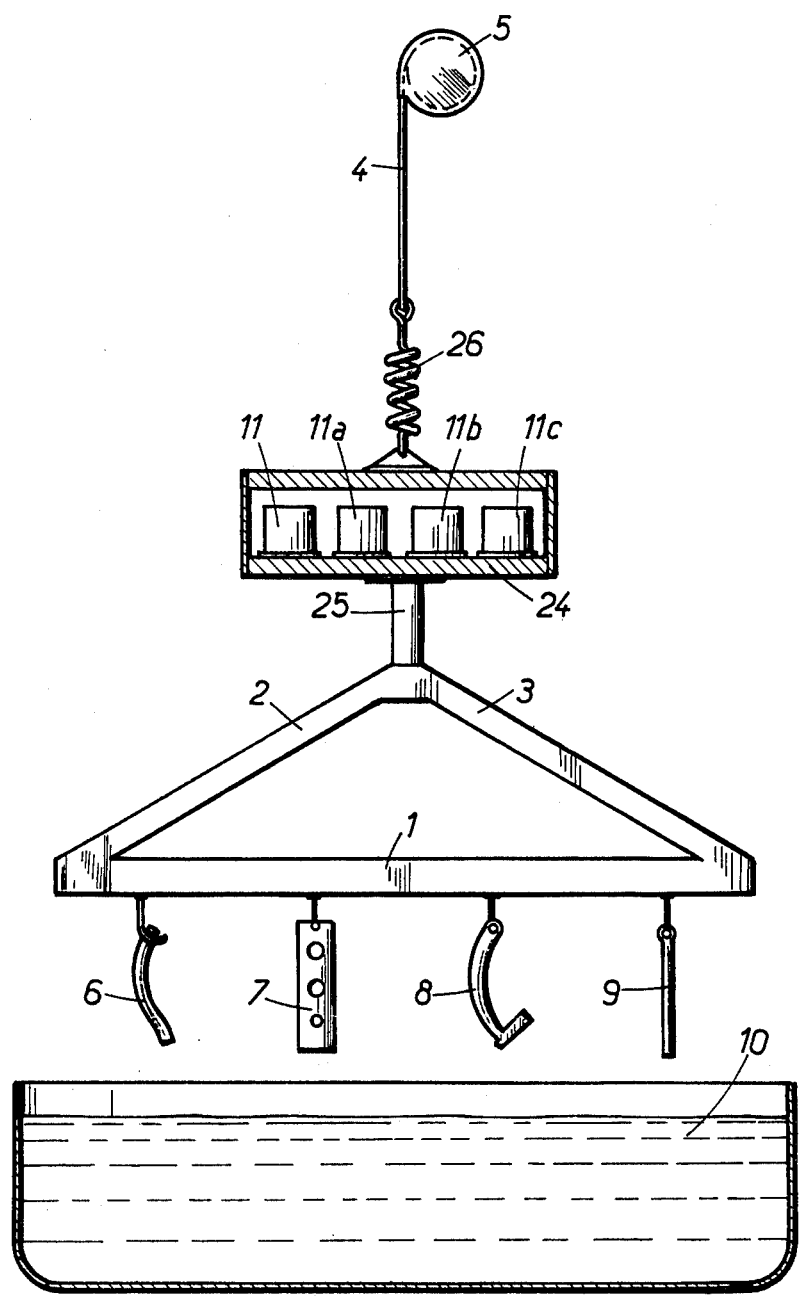
FIG.:3

MACHINE FOR DRAINING PARTS EMERGING FROM HOT GALVANIZING BATHS

This is a division of application Ser. No. 785,790 filed Apr. 8, 1977, now U.S. Pat. No. 4,129,668.

This invention relates to a method of facilitating the draining of parts emerging from hot galvanizing baths, and to machines for performing this method.

When objects have been galvanized by hot-dipping, surplus zinc is found to adhere in certain places, and holes or openings in the objects may even be covered by a film of zinc.

Such surplus zinc is not only detrimental to the appearance of component parts but will often prevent them from being assembled in the way they were designed to be, and must therefore be eliminated. Its hardness and the places where it accumulates then involve manual work with a file, and this work is not only lengthy but takes up the time of costly personnel.

In order to avoid this metal removal work, an endeavour is made to drain the parts more effectivley by moving them about and even jolting them as they emerge from the baths. These operations must be carried out before the zinc solidifies, that is, within less than one minute from the time the parts leave the galvanizing baths. Not only is this method laborious, but it does not completely eliminate the need for subsequent filing.

With a view to improving the method, attempts have been made to set the parts vibrating by a periodic excitation at fixed or slightly varying frequency. Good results have been obtained, though only in specific cases involving parts having dimensions, shapes and weights lying within clearly defined limits, and it has not been possible to extrapolate from these special cases to cover a complete production output. Further, unduly powerful excitation has been known to unhook parts from their supports (lifting beams, pulley blocks, overhead travelling cranes) or to cause damage to the same.

The Applicant accordingly conceived of a method based on the use of a range of vibration excitation frequencies capable of covering the fundamental frequencies of the parts to be drained. The basic principle consists in using narrow-band "white noise" to excite the support for the parts issuing from the galvanizing bath whereby, irrespective of their dimensions, shapes or weights, such parts be excited and made to vibrate in at least one of their natural modes. The parts then enter into resonance, whereby only a small expenditure of energy is needed to carry the method into practice.

In a first embodiment of the invention, a single exciter fed with white noise is used. In a second embodiment, a number of small vibrators are used, each of which delivers one of the frequencies in the chosen spectrum, thereby to provide a kind of white noise synthesis.

Recourse may be had to vibrators of any convenient type, such as pneumatic, hydraulic, electric or electromagnetic vibrators. Because the draining must be completed before the zinc solidifies, these vibrators must be activated very quickly—within less than a minute of the parts emerging from the galvanizing bath.

A more complete appreciation of the invention will be readily appreciated as the same becomes better understood by reference to the following description considered in connection with the accompanying drawings.

FIG. 1 is a schematic drawing of a first form of embodiment utilizing electromagnetic exciters controlled by a generator and amplifiers;

FIG. 2 is a schematic drawing of a second form of embodiment, which may utilize pneumatic exciters, for example; and FIG. 3 is a schematic drawing of an alternative arrangement of vibrators mounted between the support used for the parts and the appliance used for lifting this support.

FIG. 1 is a schematic drawing of the first embodiment employing an exciter fed with white noise, in which a lifting-beam 1 is supported by a structure formed with two arms 2 and 3 and joined by a cable 4 to a hoisting pulley-block 5.

Hooked onto lifting-beam 1 are parts 6, 7, 8, 9 which have just been lifted out of a hot-galvanizing bath 10 by hoisting lifting-beam 1 by means of pulley-block 5.

Vibrators 11 and 11a are suspended from the tops of the two arms 2 and 3 by elastic means possibly consisting of a spring 12 and a false lifting-beam 13. Linking rods 14 and 14a secure vibrators 11 and 11a to lifting-beam 1. Said vibrators are of any convenient type well-known per se, such as electromagnetic vibrators, and are energized by a random noise generator 15 through the medium of amplifiers 16 and 17.

The amplitude of the vibrations must be adjustable so that it can be adapted to the load suspended from lifting-beam 1.

The vibrations are transmitted from vibrators 11 and 11a to lifting-beam 1 through the rigid links 14 and 14a, and the parts 6, 7, 8, and 9 are themselves set vibrating, thereby to cause them to be completely drained.

Reference is next had to FIG. 2 for an illustration of the second form of embodiment, in which a number of vibrators 11, 11a, 11b and 11c deliver frequencies which, though different, are close enough to one another to reconstruct a white noise.

In this embodiment recourse may be had either to electromagnetic, pneumatic or hydraulic exciters or to electric, pneumatic or hydraulic unbalance-type vibrators such as vibrators in which a ball impelled by a stream of compressed air and revolving around the axis in a toroidal duct induces a vibration the frequency of which can be varied by merely adjusting the flow of compressed air to obtain faster or slower revolving of the ball. Such pneumatic vibrators can include balls of different diameters in order to obtain different vibration amplitudes.

Such an arrangement accordingly permits of inducing vibrations of widely varying frequency and amplitude in the lifting-beam 1 supporting parts 6, 7, 8 and 9 having greatly differing shapes, sizes and weights.

The compressed air can be supplied by any convenient source, such as a compressor 20 feeding, through a flexible hose 21, a manifold 22 fixed to arms 2 and 3 and distributing the fluid to vibrators 11, 11a, 11b and 11c by way of regulating valves 23, 23a, 23b and 23c.

In the arrangement shown in FIG. 2, the vibrators are mounted directly on lifting-beam 1, but could alternatively be mounted on a false lifting-beam as in the arrangement illustrated in FIG. 1.

Reference is lastly had to FIG. 3 for a schematic drawing of an arrangement in which vibrators 11, 11a, 11b and 11c of any convenient type are housed in a container 24 mounted between hoisting means represented by the pulley-block 5 and the assembly formed by lifting-beam 1 and its arms 2 and 3.

Container 24 is connected to arms 2 and 3 through a rigid support 25. The vibrations emitted by vibrators 11, 11a, 11b and 11c are thus transmitted to the parts to be drained 6, 7, 8 and 9 through the support 25 supporting arms 2 and 3 and lifting-beam 1.

Container 24 is linked to pulley-block 5 through elastic means, such as represented by the spring 26 and so devised that the vibrations emitted by vibrators 11, 11a, 11b and 11c not be transmittable to pulley-block 5, whereby said elastic means prevent damage by vibration to the lifting equipment used in the installation.

I claim:

1. A machine for draining parts emerging from a hot galvanizing bath comprising a support structure including an elastically suspended lifting-beam; means on said beam to rigidly link a plurality of parts to be drained; vibrator means constructed and arranged with said beam to vibrate said plurality of parts; energizer means for said vibrator means including means for controlling the vibrations of said plurality of parts within a frequency range of narrow-band "white noise," the said frequency range covering the natural fundamental frequencies of said parts.

2. A machine according to claim 1 wherein said vibrator means are mounted directly on the said beam.

3. A machine according to claim 1 including a container for housing said vibrator means, and means for hoisting said lifting-beam, and wherein said vibrator means are housed in said container mounted between the means for hoisting said lifting-beam and said lifting-beam, with a rigid connection being provided between said container and said lifting-beam and a vibration-filtering elastic connection also being provided between said container and said hoisting means.

4. A machine according to claim 1 wherein said vibrator means have adjustable frequencies.

5. A machine according to claim 1 wherein said vibrator means have adjustable amplitudes.